United States Patent
Ahn et al.

(10) Patent No.: US 7,564,965 B2
(45) Date of Patent: Jul. 21, 2009

(54) WIRE COMMUNICATION TERMINAL HAVING LCD MODULE

(75) Inventors: Sang-Moon Ahn, Gyeonggi-Do (KR); Jong-Won Lim, Gyeonggi-Do (KR)

(73) Assignee: LG-Nortel Co., Ltd., Seoul (KR)

( * ) Notice: Subject to any disclaimer, the term of this patent is extended or adjusted under 35 U.S.C. 154(b) by 512 days.

(21) Appl. No.: 11/411,841

(22) Filed: Apr. 27, 2006

(65) Prior Publication Data
US 2006/0268188 A1 Nov. 30, 2006

(30) Foreign Application Priority Data
May 16, 2005 (KR) ...................... 10-2005-0040572

(51) Int. Cl.
*H04M 1/00* (2006.01)
*H04M 9/00* (2006.01)
(52) U.S. Cl. .................. 379/419; 379/428.03; 379/436
(58) Field of Classification Search ................ 379/419, 379/428.03, 428.04, 433.11–433.13, 436; 361/681–683; 16/223
See application file for complete search history.

(56) References Cited

U.S. PATENT DOCUMENTS 4,989,167 A * 1/1991 Kapec et al. ................ 361/681
5,583,744 A * 12/1996 Oguchi et al. ............... 361/683
5,761,297 A 6/1998 Kingsbury et al.
2005/0078818 A1 * 4/2005 Bae ....................... 379/433.13

FOREIGN PATENT DOCUMENTS

| | | |
|---|---|---|
| CH | 683 658 A5 | 4/1994 |
| CN | 1148925 A | 4/1997 |
| JP | 08272307 | * 10/1996 |
| WO | WO96/29809 | 9/1996 |

OTHER PUBLICATIONS

Chinese Office Action dated Jun. 6, 2008.
European Search Report dated Jul. 3, 2006.

* cited by examiner

*Primary Examiner*—Tuan D Nguyen
(74) *Attorney, Agent, or Firm*—Ked & Associates LLP

(57) ABSTRACT

A wire communication terminal has a position adjusting member which allows an LCD module to slide to any angle within a predetermined rotational range. The terminal includes a first case having a through hole, a guide member fixed to a rear surface of the first case, a slide member having a circular arc shape provided at one side of the LCD module, and a cover member having a circular arc shape fixed to a rear surface of the first case. Arranged in this manner, the slide member can slide along a rear surface of the guide member to an optimal desired viewing angle.

21 Claims, 5 Drawing Sheets

WIRE COMMUNICATION TERMINAL HAVING LCD MODULE

BACKGROUND OF THE INVENTION

1. Field of the Invention

The present invention generally relates to communication terminals and more particularly to a wire communication terminal having an LCD module.

2. Description of the Related Art

Wire communication terminals such as key phones, video phones, etc. are often provided with LCD modules for displaying various forms of information. This information includes a driving state of the terminal and information relating to the overall communication device. The LCD modules are installed along one side of the terminal, usually at an angle which is controlled so that the user can conveniently see the module.

FIG. 1 is a front view of a wire terminal having an LCD module in accordance with the related art. The terminal includes a liquid crystal portion 1a in an LCD module 1, a camera 1b at the end of the LCD module, mounting groove 2 at both lateral ends of the LCD module, and a plurality of angle-controlling protrusions 3 at a rear surface of the LCD module in a circular arc shape. These protrusions are used to constantly maintain an angle of the LCD module at a user-desired setting.

A mounting portion 5 for mounting the LCD module is formed at one side of a first case 4, and a mounting protrusion 6 corresponding to the mounting groove 2 is formed at both sides of mounting portion 5. A plurality of stoppers 7 corresponding to the plurality of angle controlling protrusions 3 are formed in the middle of mounting portion 5.

In the related wire communication terminal, since mounting protrusion 6 is adapted to fit into the mounting groove 2, the LCD module can be rotated by a certain angle based on mounting protrusion 6. The angle controlling protrusions 3 are then stopped by stopper 7, thereby constantly controlling the angle of the LCD module. However, since the angle of the LCD module is determined only by the angle controlling protrusions and the stopper contacting the angle controlling protrusions, a user has difficulty in rotating the LCD module to a desired angle.

This may adversely affect the ability to view the LCD at optimum angle. That is, the LCD module has a resolution that greatly varies according to its angle. The angle of the LCD module therefore should be set precisely and consistent with each individual user's eye level. However, in the related-art wire communication terminal, since the angle of the LCD module is determined only by the angle controlling protrusions and the stopper contacting the angle controlling protrusions, the LCD module cannot be precisely rotated to an angle considered optimal for viewing by each individual user.

In the case, the resolution of the LCD module therefore can be drastically degraded, so much so that a user may not be able to precisely view the contents displayed on the LCD module. To compensate for these drawbacks, the user must adjust his eye level in order to increase the viewing resolution of the LCD.

BRIEF DESCRIPTION OF THE INVENTION

An object of the invention is to solve at least the above problems and/or disadvantages and to provide at least the advantages described hereinafter Another object of the present invention is to provide a wire communication terminal having an LCD module which is capable of achieving improved viewing.

Another object of the present invention is to provide a wire communication terminal which allows a user to adjust a viewing angle of the LCD module more conveniently and effectively compared with related-art terminals, to thereby optimize viewing resolution for each individual user's eye level.

These and other objects and advantages of the present invention may be achieved by providing a wire communication terminal having an LCD module, comprising: a first case having a mounting portion for mounting an LCD module at one side thereof, the mounting portion provided with a through hole; a guide member fixed to a rear surface of the first case so as to be located at the through hole; a slide member having a circular arc shape and provided at one side of the LCD module so as to be inserted into the through hole and to be slid along a rear surface of the guide member; a cover member having a circular arc shape and fixed to the rear surface of the first case so that the slide member can be slid along the rear surface of the guide member; and a second case coupled to the first case.

A first guide protrusion may be formed at both sides of the rear surface of the guide member along a rotation direction of the LCD module, and a slide protrusion corresponding to the first guide protrusion may be formed at both sides of a front surface of the slide member along the rotation direction of the LCD module. A slide groove may be formed at both sides of a rear surface of the slide member, and a second guide protrusion corresponding to the slide groove may be formed at both sides of a front surface of the cover member along the rotation direction of the LCD module.

In accordance with one embodiment, a slide slit for limiting a rotation range of the LCD module may be formed in the middle of the slide member along the rotation direction of the LCD module, and a stopper may be formed in the middle of the front surface of the cover member so as to be inserted into the slide slit.

In addition, an insertion groove for inserting the end of the stopper may be formed in the middle of the guide member. A plurality of bosses having bolt holes may also be formed at the rear surface of the first case, and a plurality of insertion portions having bolt holes are formed at a flange portion of the cover member so as to correspond to the bosses. Each boss is fitted into each insertion portion, and a bolt is coupled to the bolt hole.

Preferably, the guide member and the cover member are formed of a lubricating material, especially, POM. A space portion is formed between the guide member and the cover member, and the slide member is slidably fitted into the space portion.

The guide member, the cover member, and the slide member have the same curvature so that the slide member can be smoothly slid in the space portion.

DETAILED DESCRIPTION OF INVENTION

The wire communication terminal in accordance with one or more embodiments of the present invention provides improved performance because it can be rotated throughout any angle within a predetermined rotation range, not to only a limited or discrete number of preset angles as is the case with related-art terminals having LCD modules.

Figure 1:
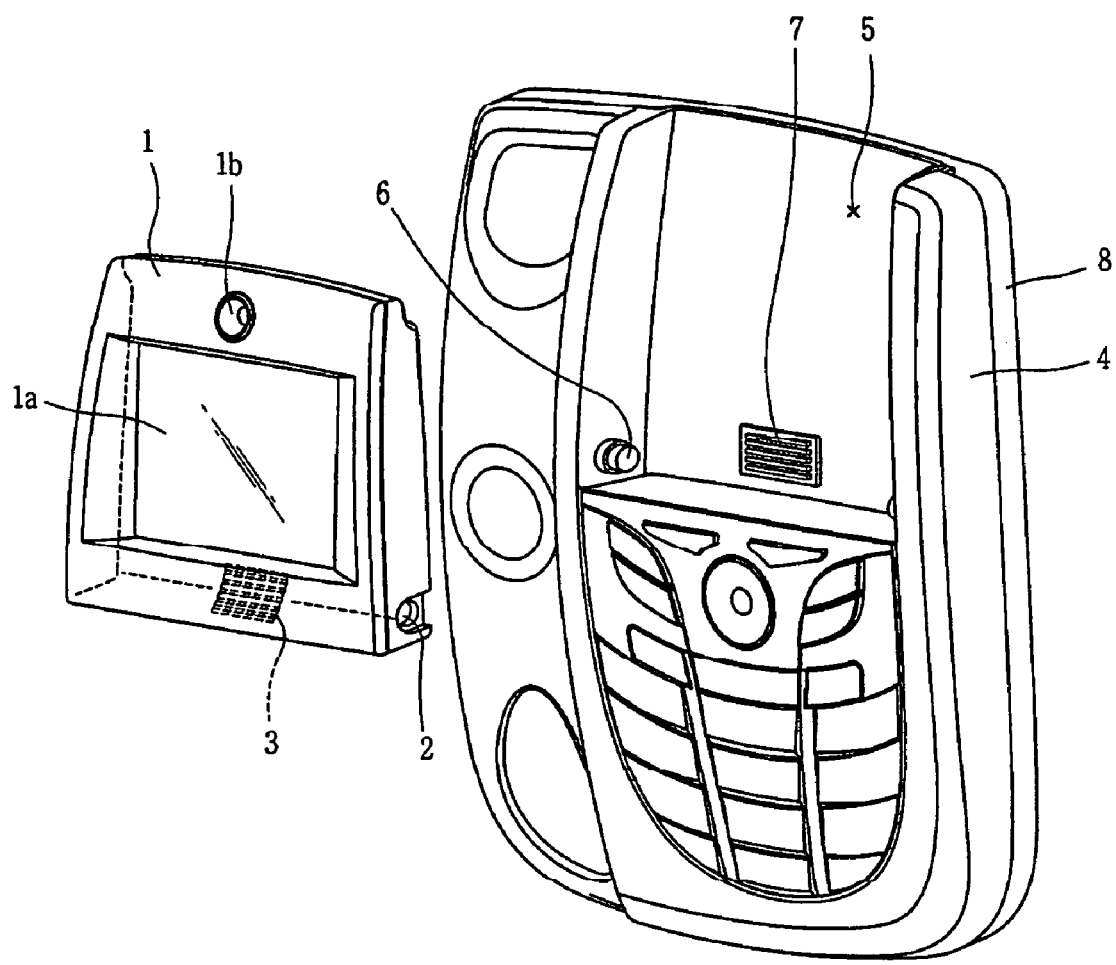
FIG. 1 is a disassembled front perspective view showing a wire communication terminal having an LCD module in accordance with the related art.
Figure 2:
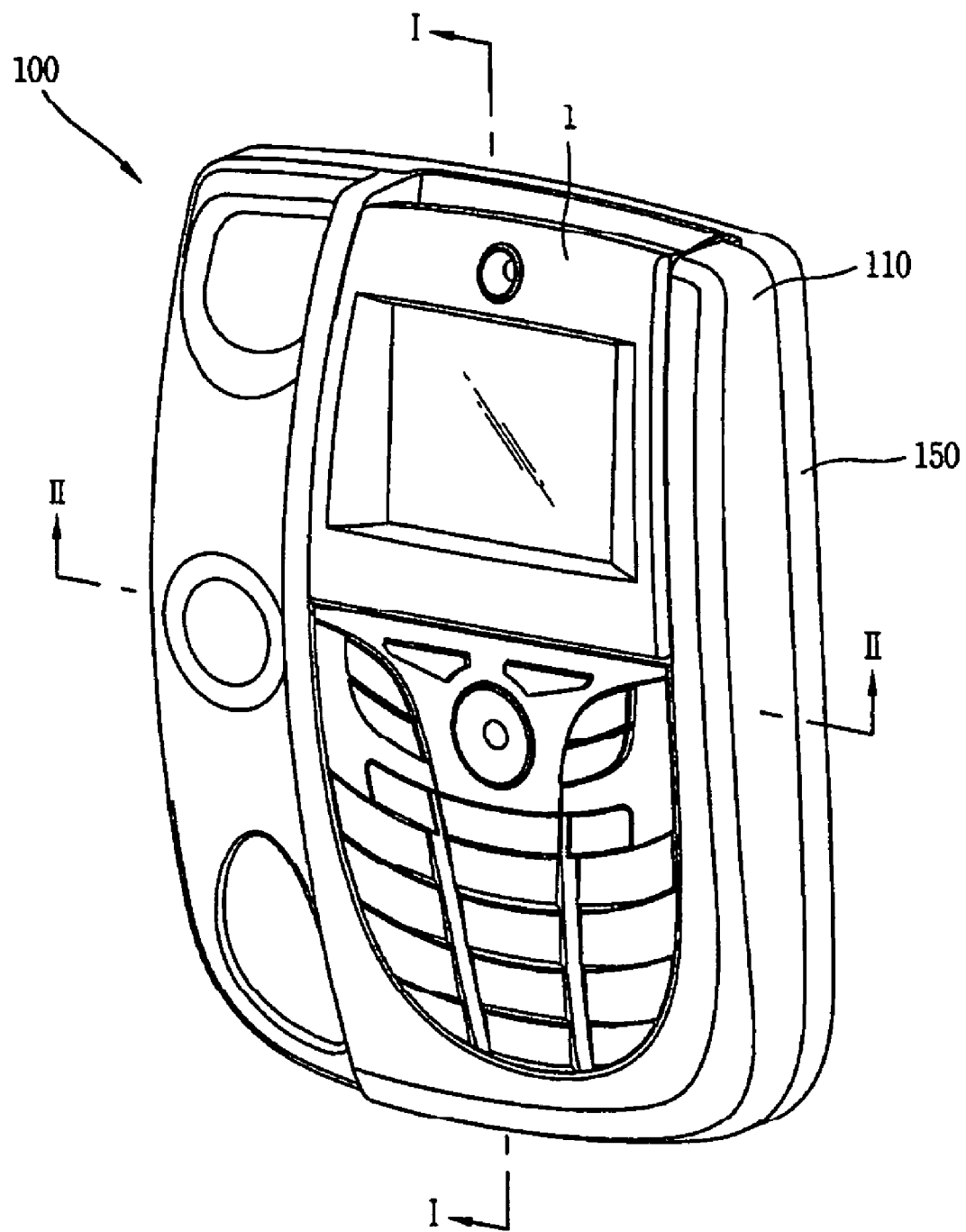
FIG. 2 is a front perspective view showing a wire communication terminal having an LCD module according to one embodiment of the present invention.

FIG. 2 is a front perspective view showing a wire communication terminal 100 having an LCD module according to one embodiment of the present invention. This terminal includes a first case 110 having a mounting portion 111 for mounting an LCD module 1 at one side thereof. The mounting portion 111 is provided with a through hole 112.

The terminal also includes a guide member 120, a slide member 130, and a cover member 140. The guide member 120 is fixed to a rear surface of the first case 110 so as to be positioned at the through hole 112. The slide member 130 has a circular arc shape and is provided at one side of the LCD module 1, so as to be inserted into the through hole 112 and to be slid along a rear surface of the guide member 120. The cover member 140 has a circular arc shape and is fixed to the rear surface of the first case 110, so that slide member 130 can be slid along the rear surface of guide member 120. A second case 150 may be coupled to the first case 110.

Figure 5:
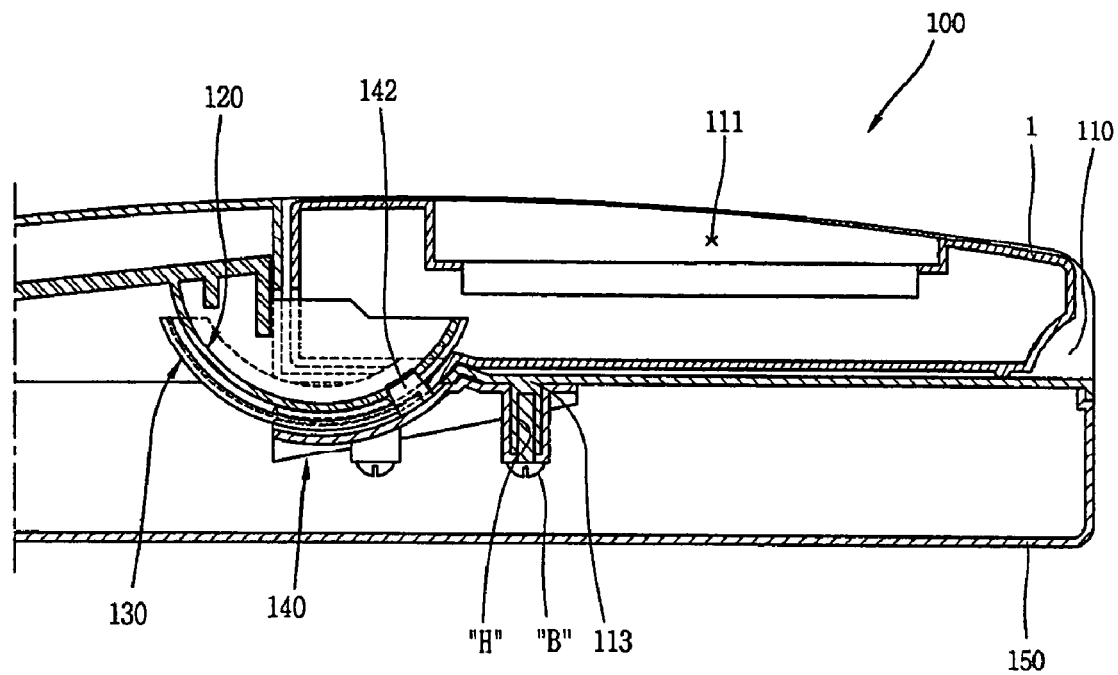
FIG. 5 is a sectional view taken along line I-I in FIG. 2.
Figure 6:
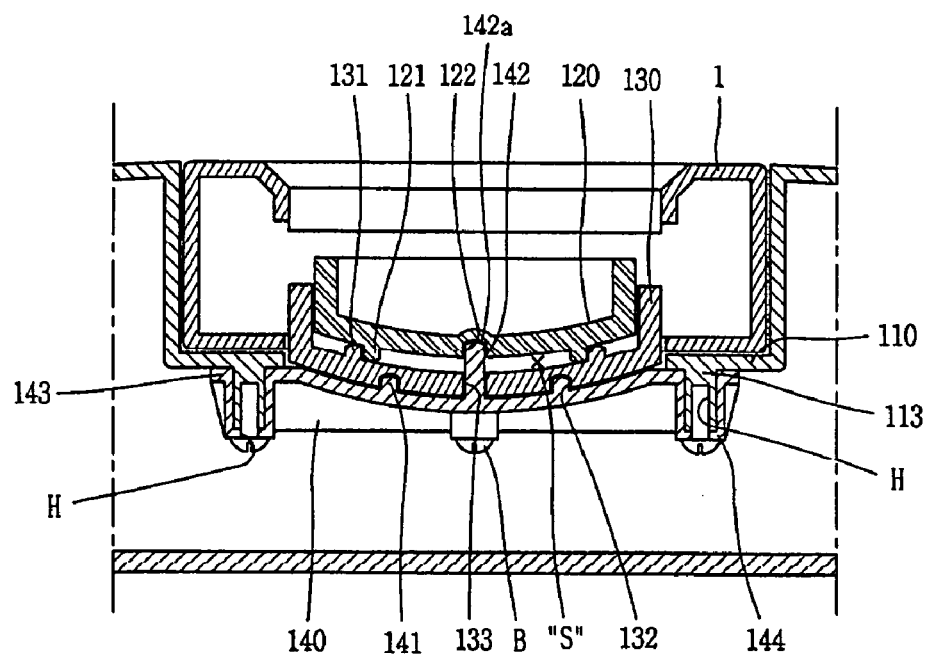
FIG. 6 is a sectional view taken along line II-II in FIG. 2.

In addition to these features, a space portion "S" is formed between guide member 120 and cover member 140, and slide member 130 is slidably fitted into the space portion S. Guide member 120, slide member 130, and cover member 140 preferably has the same curvature so that slide member 130 can be smoothly slid in the space portion S. (See, for example, FIGS. 5 and 6.)

Figure 3:
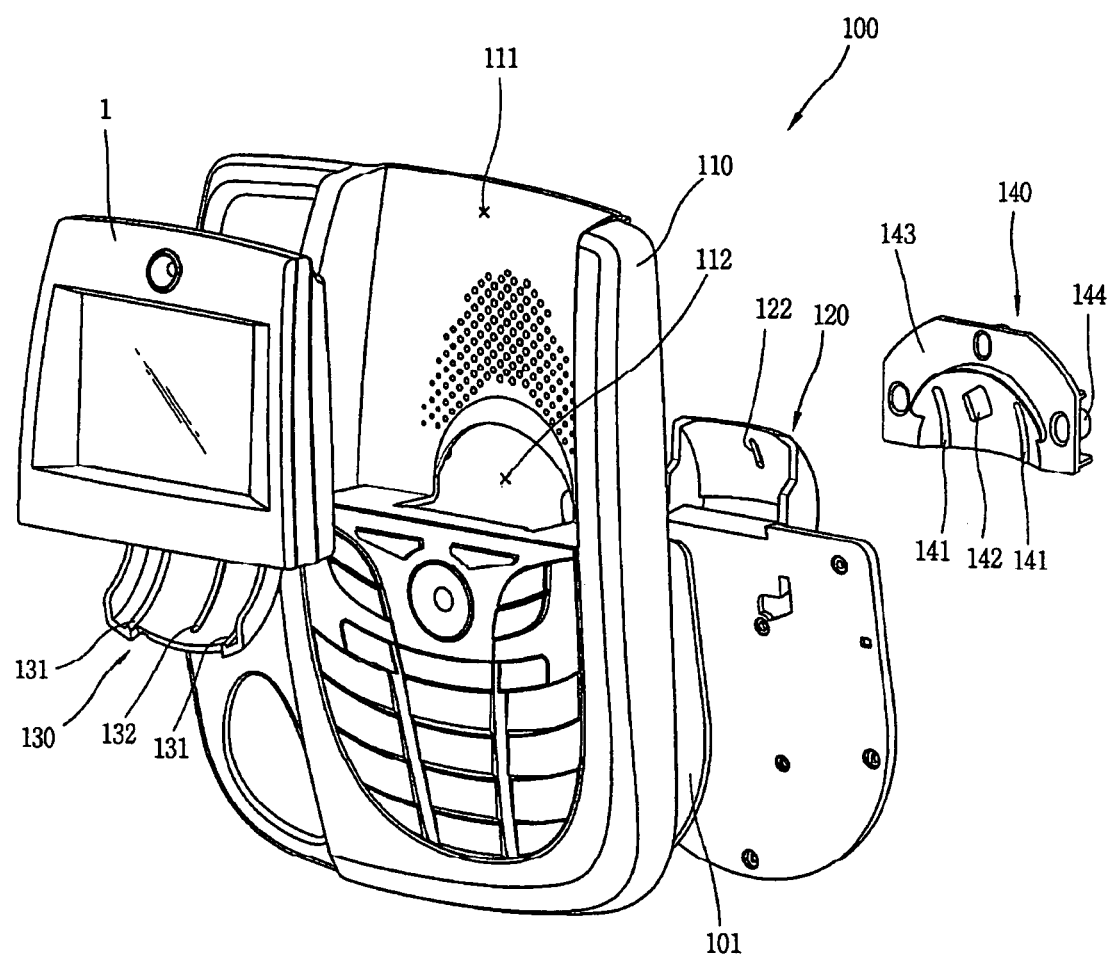
FIG. 3 is a disassembled front perspective view showing the wire communication terminal having an LCD module according to one embodiment of the present invention.
Figure 4:
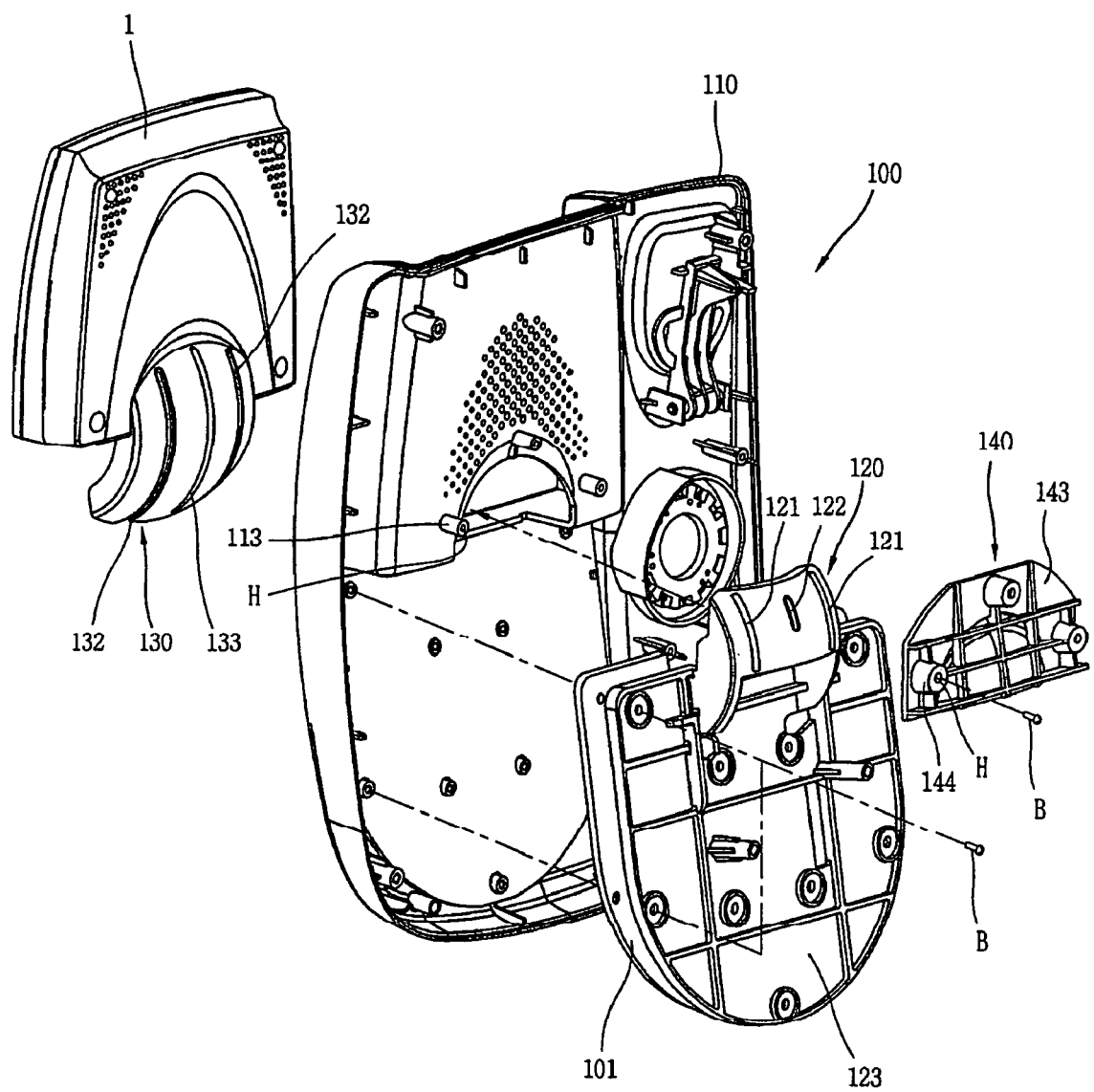
FIG. 4 is a disassembled rear perspective view showing the wire communication terminal having an LCD module according to one embodiment of the present invention.

A first guide protrusion 121 is formed at both sides of the rear surface of guide member 120 along a rotation direction of the LCD module 1. Slide protrusion 131 corresponding to first guide protrusion 121 is formed at both sides of a front surface of the slide member 130 along the rotation direction of the LCD module 1. (See, e.g., FIGS. 3, 4, and 6.)

A slide groove 132 is formed at both sides of a rear surface of slide member 130, and a second guide protrusion 141 corresponding to slide groove 132 is formed at both sides of a front surface of cover member 140 along the rotation direction of the LCD module 1. (See, e.g, FIGS. 3, 4, and 6.)

A slide slit 133 for limiting a rotation range of the LCD module is formed in the middle of slide member 130 along the rotation direction of the LCD module 1, and stopper 142 is formed in the middle of the front surface of cover member 140 so as to be inserted into slide slit 133. An insertion groove 122 into which is inserted an end 142a of stopper 142 is formed in the middle of guide member 120.

A plurality of bosses 113 having bolt holes H are formed at the rear surface of the first case 110, and a plurality of insertion portions 144 having bolt holes H are formed at a flange portion 143 of the cover member 140 so as to correspond to the bosses 113. Each boss 113 is fitted into each insertion portion 144 and a bolt B is coupled to the bolt hole H, thereby fixing cover member 140 to first case 110. Preferably, guide member 120 and cover member 140 are formed of a lubricating material, especially, polyoxymethylene (POM) such as engineering plastic so that the slide member 130 can be smoothly slid between guide member 120 and cover member 140 with a frictional force.

An assembly processes for the wire communication terminal having an LCD module according to the present invention will now be explained. As shown in FIGS. 3 to 6, the guide member 120 is located at the rear surface of first case 110 and the bolt B is coupled to bolt hole H of guide member 120, thereby coupling guide member 120 to first case 110 with a printed circuit board 101. Under the state, slide member 130 is inserted into through hole 112 and then is adhered to the rear surface of guide member 120. Slide protrusion 131 of slide member 130 comes into contact with first guide protrusion 121 of guide member 120.

Then, insertion portion 144 of cover member 140 is coupled to boss 113 formed at the rear surface of first case 110, and bolt B is coupled to the bolt hole H to thereby fix cover member 140 to first case 110. Since second guide protrusion 141 is fitted into slide groove 132 of the slide member, slide member 130 is slidable within the space portion S formed between guide member 120 and cover member 140. The second case 150 is then coupled to first case 110 to thereby complete the assembly of the communication device.

Operation of the wire communication terminal of the present invention will now be explained. Referring to FIG. 2, when a user wants to control an angle of the LCD module, the user lifts the end of the LCD module in the arrow direction.

As the LCD module is lifted, slide member 130 fixed to the LCD module is slid within space portion S between guide member 120 and cover member 140. When slide member 130 is slid, first guide protrusion 121 corresponds to slide protrusion 131 of slide member 130 and second guide protrusion 141 corresponds to slide groove 132 of slide member 130. Accordingly, slide member 130 smoothly slides while maintaining a proper frictional force.

When slide member 130 is slid to a user's desired position, the user lets slide member 130 (held by his hand) go. Since guide member 120 and cover member 140 are formed of polyoxymethylen, slide member 130 smoothly slides. Also, since first guide protrusion 121 corresponds to slide protrusion 131 of slide member 130, and second guide protrusion 141 corresponds to slide groove 132 of slide member 130, slide member 130 is located precisely at the user's desired position, thereby optimizing the viewing resolution of the LCD for each individual user's eye level.

A maximum rotation angle of the LCD module is limited by stopper 142 fitted into slide slit 133, so that the LCD module is rotated only by a set angle without being rotated too much. Accordingly, users can control the angle of the LCD module fixed to slide member 130 simply and conveniently.

In summary, the angle of the LCD module of the wire communication terminal of the present invention conveniently and simply controlled by users, and at the same time improves resolution of the LCD module for viewing. Also, since the angle of the LCD module is freely controlled simply, the productivity is enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A wire communication terminal having an LCD module, comprising:
    a first case having a mounting portion for mounting an LCD module at one side thereof, the mounting portion provided with a through hole;
    a guide member fixed to a rear surface of the first case so as to be located at the through hole;
    a slide member having a circular arc shape and provided at one side of the LCD module, so as to be inserted into the through hole and to be slid along a rear surface of the guide member;
    a cover member having a circular arc shape and fixed to the rear surface of the first case so that the slide member can be slid along the rear surface of the guide member; and
    a second case coupled to the first case.

2. The terminal of claim 1, further comprising:
    a first guide protrusion formed at respective sides of a rear surface of the guide member along a rotation direction of the LCD module,
    a slide protrusion corresponding to the first guide protrusion being formed at sides of a front surface of the slide member along the rotation direction of the LCD module,
    a slide groove formed at both sides of a rear surface of the slide member, and
    a second guide protrusion corresponding to the slide groove is formed at respective sides of a front surface of the cover member along the rotation direction of the LCD module.

3. The terminal of claim 2, further comprising:
    a slide slit limiting a rotation range of the LCD module, the slide slit formed in a middle of the slide member along the rotation direction of the LCD module; and
    a stopper formed in the middle of the front surface of the cover member so as to be inserted into the slide slit.

4. The terminal of claim 3, further comprising:
    an insertion groove, formed in the middle of the guide member, into which an end of the stopper is inserted.

5. The terminal of claim 1, wherein the first case includes a plurality of bosses having bolt holes at rear surface thereof, and a plurality of insertion portions having bolt holes formed at a flange portion of the cover member so as to correspond to the bosses.

6. The terminal of claim 5, wherein the bosses are fitted into the insertion portions, and a bolt is coupled to the bolt hole.

7. The terminal of claim 1, wherein the guide member and the cover member are formed of a lubricating material.

8. The terminal of claim 7, wherein the guide member and the cover member are formed of polyoxymethylene.

9. The terminal of claim 1, wherein the guide member and the cover member include a space portion therebetween, and the slide member is slidably fitted into the space portion.

10. The terminal of claim 9, wherein the guide member, cover member, and slide member have a same curvature to thereby allow the slide member to smoothly slide in the space portion.

11. A wire communication terminal having an LCD module, comprising:
    a guide member located at a through hole of a first case;
    a cover member fixed to a rear surface of the first case so as to form a space portion between the guide member and the cover member; and
    a slide member formed at one side of the LCD module so as to be inserted into the space portion, wherein the cover member and the slide member have a same shape and wherein the slide member slides along a rear surface of the guide member, wherein:
    a first guide protrusion is formed at respective sides of a rear surface of the guide member along a rotation direction of the LCD module;
    a slide protrusion corresponding to the first guide protrusion is formed at respective sides of a front surface of the slide member along the rotation direction of the LCD module;
    a slide groove is formed at respective sides of a rear surface of the slide member; and
    a second guide protrusion corresponding to the slide groove is formed at respective sides of a front surface of the cover member along the rotation direction of the LCD module.

12. The terminal of claim 11, wherein said same shape is a circular arc shape.

13. The terminal of claim 11, wherein:
    a slide slit for limiting a rotation range of the LCD module is formed in the middle of the slide member along the rotation direction of the LCD module, and
    a stopper is formed in the middle of the front surface of the cover member so as to be inserted into the slide slit.

14. The terminal of claim 13, wherein the guide member has an insertion groove into which an end of the stopper is inserted.

15. The terminal of claim 11, wherein the first case includes a plurality of bosses having bolt holes at rear surfaces thereof, and a plurality of insertion portions having bolt holes are formed at a flange portion of the cover member so as to correspond to the bosses.

16. The terminal of claim 15, wherein the bosses are fitted into the insertion portions, and a bolt is coupled to the bolt hole.

17. The terminal of claim 11, wherein the guide member and the cover member are formed of a lubricating material.

18. The terminal of claim 17, wherein the guide member and the cover member are formed of polyoxymethylene.

19. The terminal of claim 11, wherein the slide member is slidably fitted into the space portion.

20. The terminal of claim 11, wherein the guide member, cover member, and slide member have a same curvature so that the slide member smoothly slides in the space portion.

21. The terminal of claim 11, wherein a flange portion of the guide member is coupled to the first case with a printed circuit board.

* * * * *